United States Patent
Ishida et al.

(10) Patent No.: US 7,330,620 B2
(45) Date of Patent: Feb. 12, 2008

(54) LOW LOSS FUNNEL-TYPE PLC OPTICAL SPLITTER WITH INPUT CLADDING MODE ABSORPTION STRUCTURE AND/OR OUTPUT SEGMENTED TAPER STRUCTURE

(75) Inventors: Kenzo Ishida, Albany, CA (US); Alan Tafapolsky, Piedmont, CA (US); Takaharu Fujiyama, Albany, CA (US)

(73) Assignee: Aidi Corporation, Ibaraki (JP)

( * ) Notice: Subject to any disclaimer, the term of this patent is extended or adjusted under 35 U.S.C. 154(b) by 0 days.

(21) Appl. No.: 11/675,896

(22) Filed: Feb. 16, 2007

(65) Prior Publication Data

US 2007/0196050 A1   Aug. 23, 2007

Related U.S. Application Data

(60) Provisional application No. 60/775,668, filed on Feb. 22, 2006.

(51) Int. Cl.
*G02B 6/02* (2006.01)
*G02B 6/10* (2006.01)

(52) U.S. Cl. .......................... 385/43; 385/45; 385/129

(58) Field of Classification Search .................. 385/43, 385/45, 123
See application file for complete search history.

(56) References Cited

U.S. PATENT DOCUMENTS

| | | | | |
|---|---|---|---|---|
| 5,926,298 A * | 7/1999 | Li | ................................. | 385/24 |
| 6,872,985 B2 * | 3/2005 | Yap | ............................... | 257/82 |
| 6,873,638 B2 * | 3/2005 | Haase et al. | ................ | 372/50.1 |
| 2002/0181868 A1 * | 12/2002 | McGreer | ....................... | 385/37 |
| 2003/0007535 A1 * | 1/2003 | Haase et al. | ................... | 372/50 |
| 2004/0069984 A1 * | 4/2004 | Estes et al. | ..................... | 257/25 |
| 2005/0018951 A1 * | 1/2005 | Mossberg et al. | .............. | 385/14 |

(Continued)

FOREIGN PATENT DOCUMENTS

WO   WO 02/103435 A2   12/2002

OTHER PUBLICATIONS

G. Neumann et al., "A New Integrated Optical-Mode Stripper Configuration: Numerical Analysis and Design", IEEE Photonics Technology Letters, IEEE Service Center vol. 8, No. 7, pp. 909-911 (Jul. 1, 1996).

*Primary Examiner*—K. Cyrus Kianni
(74) *Attorney, Agent, or Firm*—Jeffrey R. Klembczyk, Esq.; Kevin P. Radigan, Esq.; Heslin Rothenberg Farley & Mesiti P.C.

(57) ABSTRACT

A funnel-type planar lightwave circuit (PLC) optical splitter having an input optical waveguide, a slab waveguide receiving the input optical signal from the input optical waveguide, and output waveguides projecting from the slab region. The region connecting the slab waveguide to the output waveguides is characterized by a segmented taper structure. In another additional, or alternative aspect of the present invention, a cladding mode absorption region runs along either or both sides of the input optical waveguide. A funnel-type splitter with both a cladding mode absorption region and a segmented taper structure provides a "super" low loss splitter design, when considering both insertion loss and polarization dependent loss. Advantageously, the disclosed funnel-type PLC splitter does not require a quartz substrate due to its very low PDL, and a silicon substrate can be used. Silicon substrates are known to be lower cost, with a higher resistance to fracture.

6 Claims, 18 Drawing Sheets

U.S. PATENT DOCUMENTS

| | | |
|---|---|---|
| 2005/0041906 A1* | 2/2005 | Sugama et al. ............... 385/14 |
| 2005/0163459 A1* | 7/2005 | Deliwala ................... 385/147 |
| 2005/0207702 A1 | 9/2005 | Yamazaki et al. |
| 2005/0207705 A1* | 9/2005 | Laurent-Lund .............. 385/45 |
| 2006/0204175 A1* | 9/2006 | Laurent-Lund et al. ....... 385/43 |

* cited by examiner

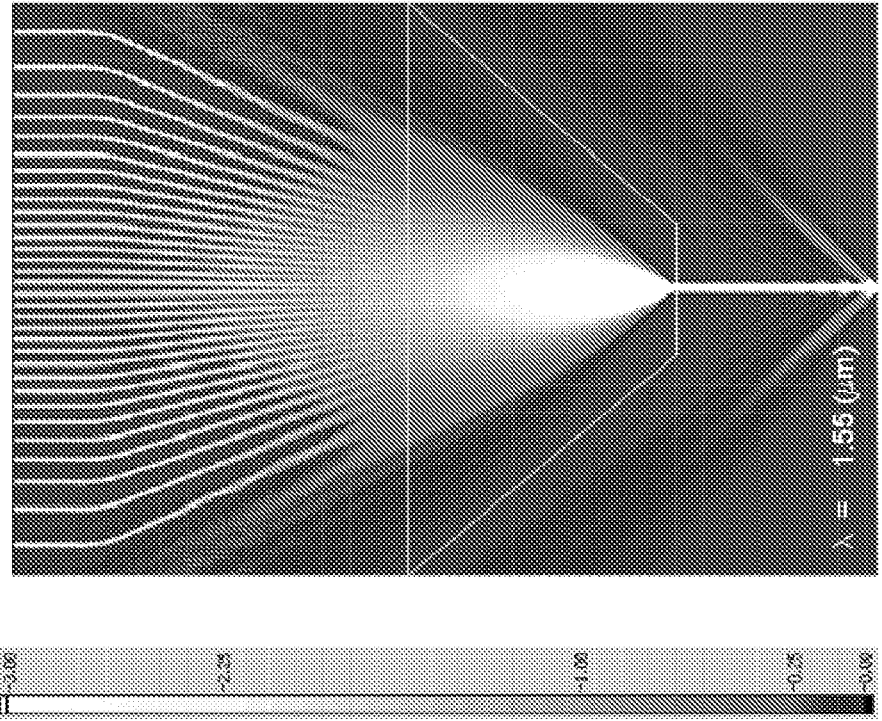
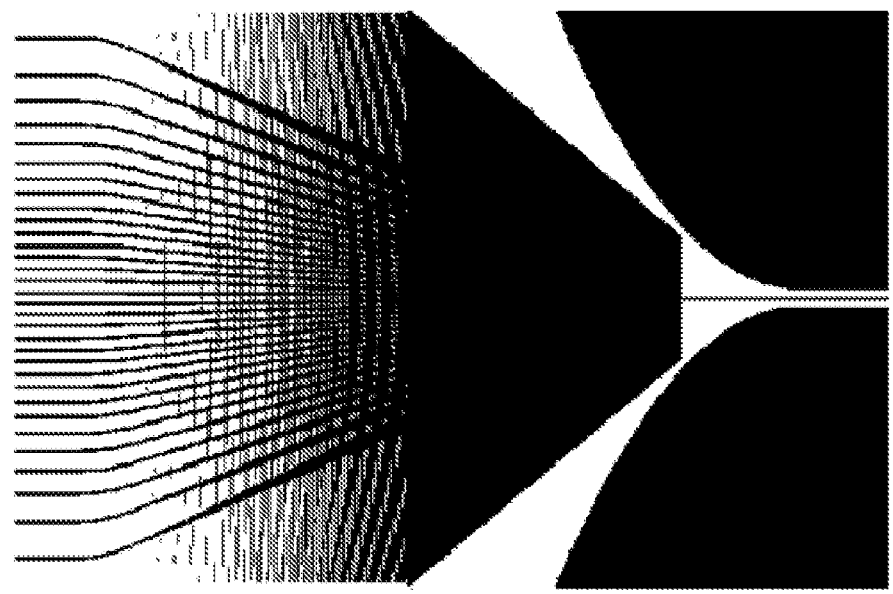
FIG. 9A
FIG. 9B

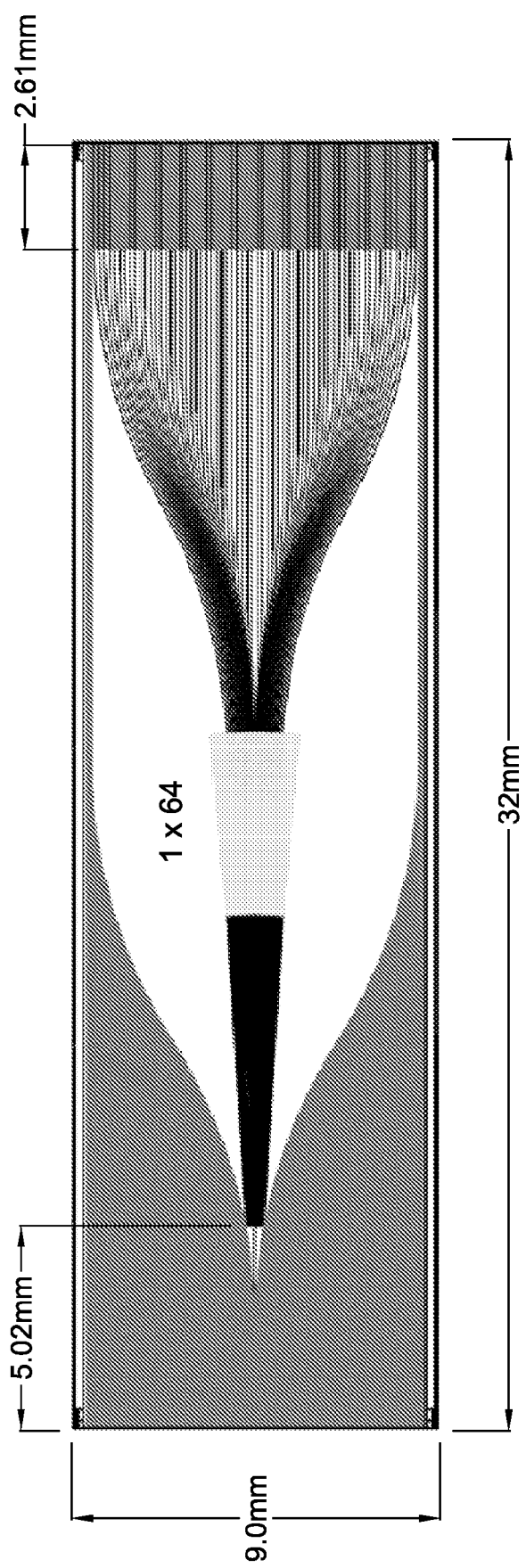

LOW LOSS FUNNEL-TYPE PLC OPTICAL SPLITTER WITH INPUT CLADDING MODE ABSORPTION STRUCTURE AND/OR OUTPUT SEGMENTED TAPER STRUCTURE

CROSS-REFERENCE TO RELATED APPLICATION

This application claims the benefit of U.S. Provisional Application No. 60/775,668, filed Feb. 22, 2006, which is hereby incorporated herein by reference in its entirety.

TECHNICAL FIELD

The present invention relates generally to planar lightwave circuit (PLC) optical splitters. More particularly, the present invention relates to an improved funnel-type PLC optical splitter having a cladding mode absorption region and/or an output segmented taper structure.

BACKGROUND OF THE INVENTION

Conventional Y-branch type planar lightwave circuit (PLC) splitters often require quartz wafer substrates to minimize polarization dependent loss (PDL). However, these types of splitters may exhibit higher insertion losses. Y-branch type splitters require longer waveguide sizes as the number of splits increases, resulting in greater insertion losses. Moreover, quartz wafer substrates can be more expensive compared to Si substrates. Quartz substrates can also be brittle.

The present invention addresses these problems, by providing a funnel-type PLC optical splitter with lower PDL, lower insertion loss, and which can advantageously be formed on a silicon substrate.

SUMMARY OF THE INVENTION

The shortcomings of the prior art are addressed, and additional advantages are provided by the present invention which in one aspect is a funnel-type planar lightwave circuit (PLC) optical splitter having an input optical waveguide comprising a core region and a cladding region, for carrying an input optical signal. A slab waveguide receives the input optical signal from the input optical waveguide, and a plurality of output waveguides project from the slab waveguide into which the input optical signal is split. The region connecting the slab waveguide to the plurality of output waveguides is characterized by a segmented taper structure.

The segmented taper structure comprises a plurality of waveguides crossing the plurality of output waveguides, wherein the core width of the crossing waveguides decreases as the distance from the slab waveguide increases.

In another additional, or alternative aspect of the present invention, a funnel-type planar lightwave circuit optical splitter is provided, having an input optical waveguide comprising a core region and a cladding region, for carrying an input optical signal. A slab waveguide receives the input optical signal from the input optical waveguide. A plurality of output waveguides project from the slab waveguide into which the input optical signal is split. A cladding mode absorption region runs along either side, or both sides, of the input optical waveguide.

The cladding mode absorption region may run gradually away from the input waveguide as the input waveguide approaches the slab waveguide; and the cladding mode absorption region may continue to run along at least a portion of the slab waveguide.

A funnel-type splitter with both a cladding mode absorption region and segmented taper structure provides a "super" low loss splitter design, when considering both insertion loss and polarization dependent loss. Advantageously, the disclosed funnel type PLC splitter does not require a quartz substrate due to its very low PDL, and a silicon substrate can be used. Silicon substrates are known to be lower cost, with a higher resistance to fracture.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter regarded as the invention is particularly pointed out and distinctly claimed at the conclusion of the specification. The foregoing and other objects, features, and advantages of the invention are apparent from the following detailed description taken in combination with the accompanying drawings in which:

FIGS. 11A & 11B show an exemplary embodiment of a 1×64 optical splitter of the present invention, and associated test results.

DETAILED DESCRIPTION OF THE INVENTION

Figure 1A:
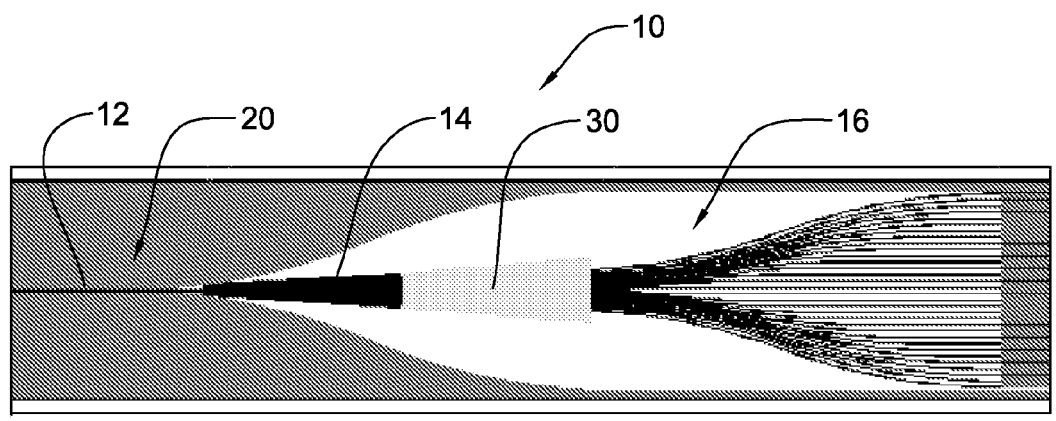
FIG. 1A is a top plan view of an exemplary embodiment of 1×32 optical splitter of the present invention.
Figure 1B:
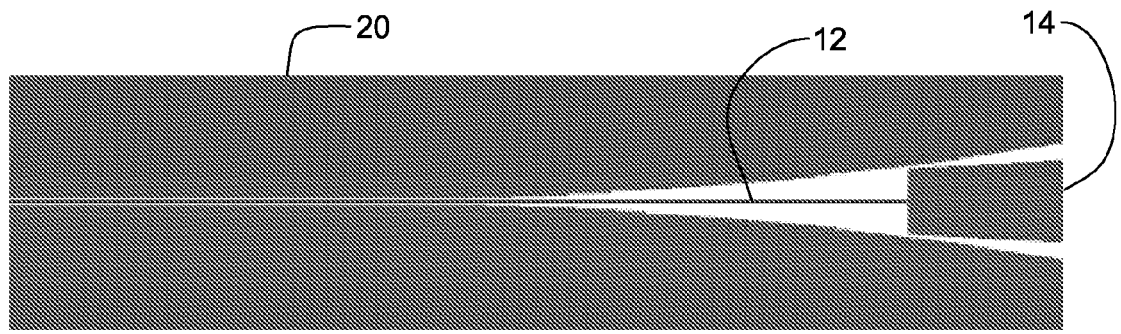
FIG. 1B is a top plan view of an exemplary cladding mode absorption region of the present invention.
Figure 1C:
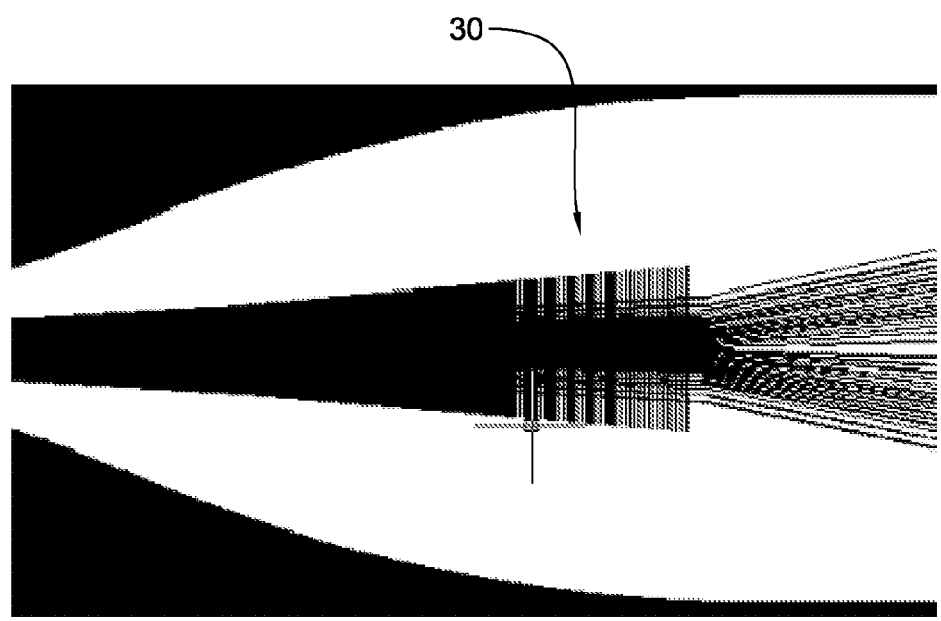
FIG. 1C is a top plan view of an exemplary segmented taper structure of the present invention.

With reference to FIGS. 1A, 1B and 1C, and as generally discussed above, an improved, funnel-type PLC optical splitter 10 is provided in accordance with one aspect of the present invention having a cladding mode absorption region 20 and/or a segmented taper structure 30. These regions are formed in and around the conventional funnel-type PLC splitter having input waveguide 12, slab region 14, and output waveguides 16 projecting from the slab region 14.

A typical funnel-type PLC optical splitter is disclosed in Takahashi et al, "Integrated-Optic 1×128 Power Splitter with Multifunnel Waveguide," IEEE Photonics Technology Letters, Vol. 5, No. 1, January 1993, pp 58-60, the entirety of which is incorporated by reference.

A very low loss splitter is disclosed herein, applicable to either a quartz waveguide structure on a silicon (Si) or glass substrate; or a polymer waveguide structure on an Si or glass substrate. The disclosed funnel-type PLC optical splitter 10 having a cladding mode absorption region 20 minimizes optical interference exhibited in the input waveguide structure, i.e., cladding mode absorption region 20 improves splitting dispersion. If an input optical fiber is directly connected to the PLC slab region 14, the clad mode is eliminated within the optical fiber. However if an input PLC waveguide is employed without a cladding mode absorption structure, splitting dispersion will be increased. The present invention minimizes splitting dispersion in the input optical waveguide 12.

Figure 3:
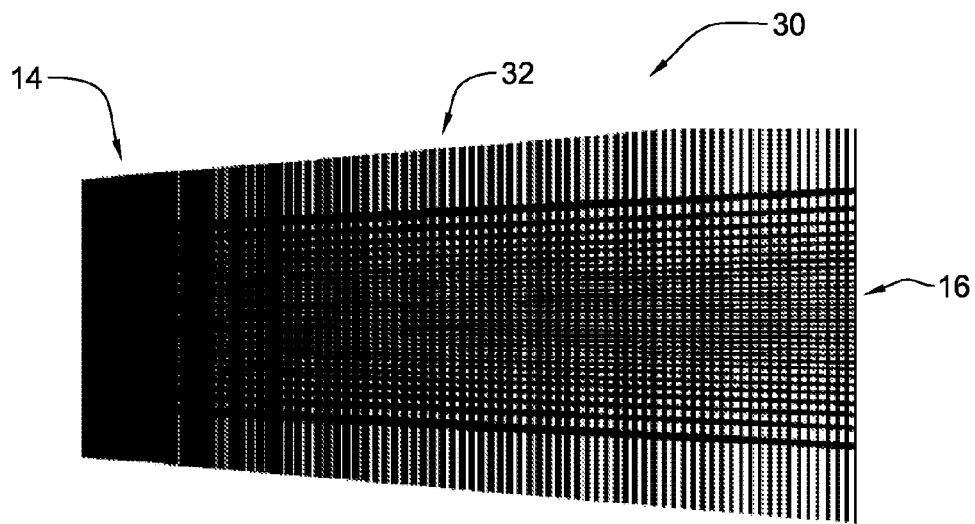
FIG. 3 is a top plan view showing additional detail of the segmented taper structure of the present invention.
Figure 4B:
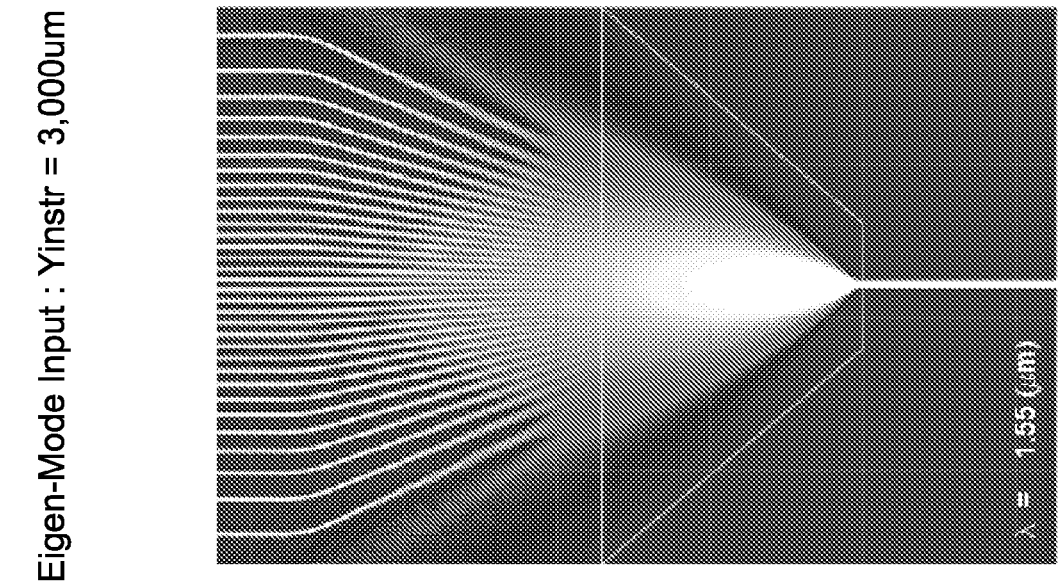
FIGS. 4-10C show test results comparing the alternate embodiments of the present invention, and different dimensions thereof.
Figure 4B:
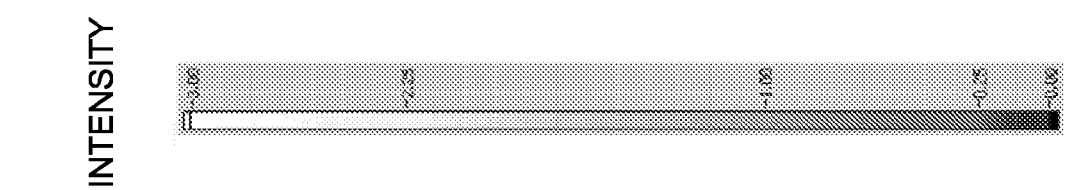
Figure 4A:
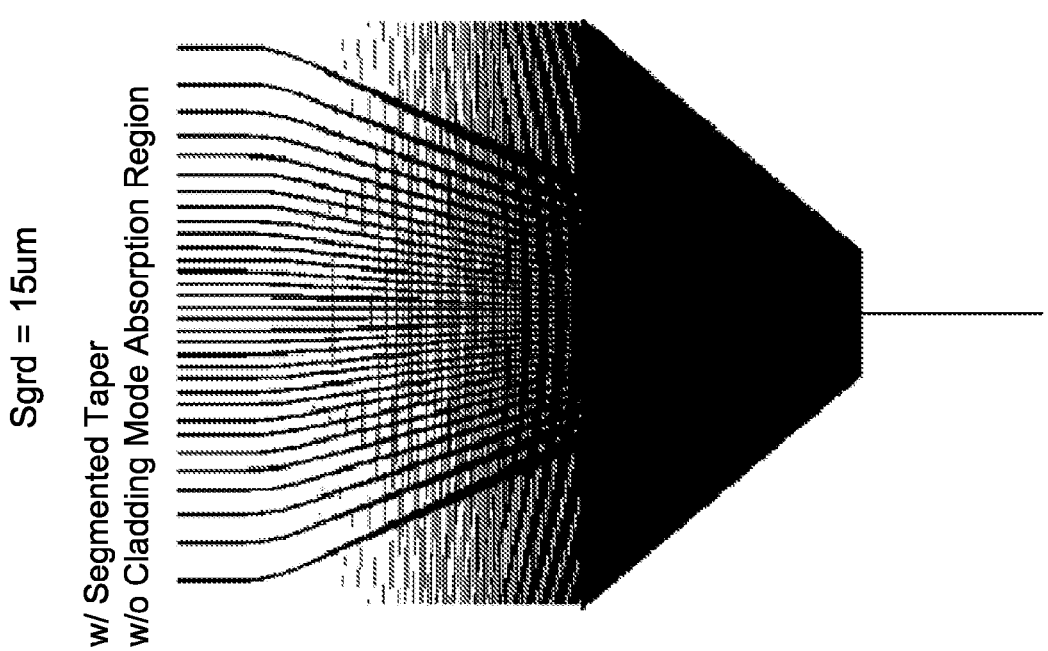
Figure 4C:
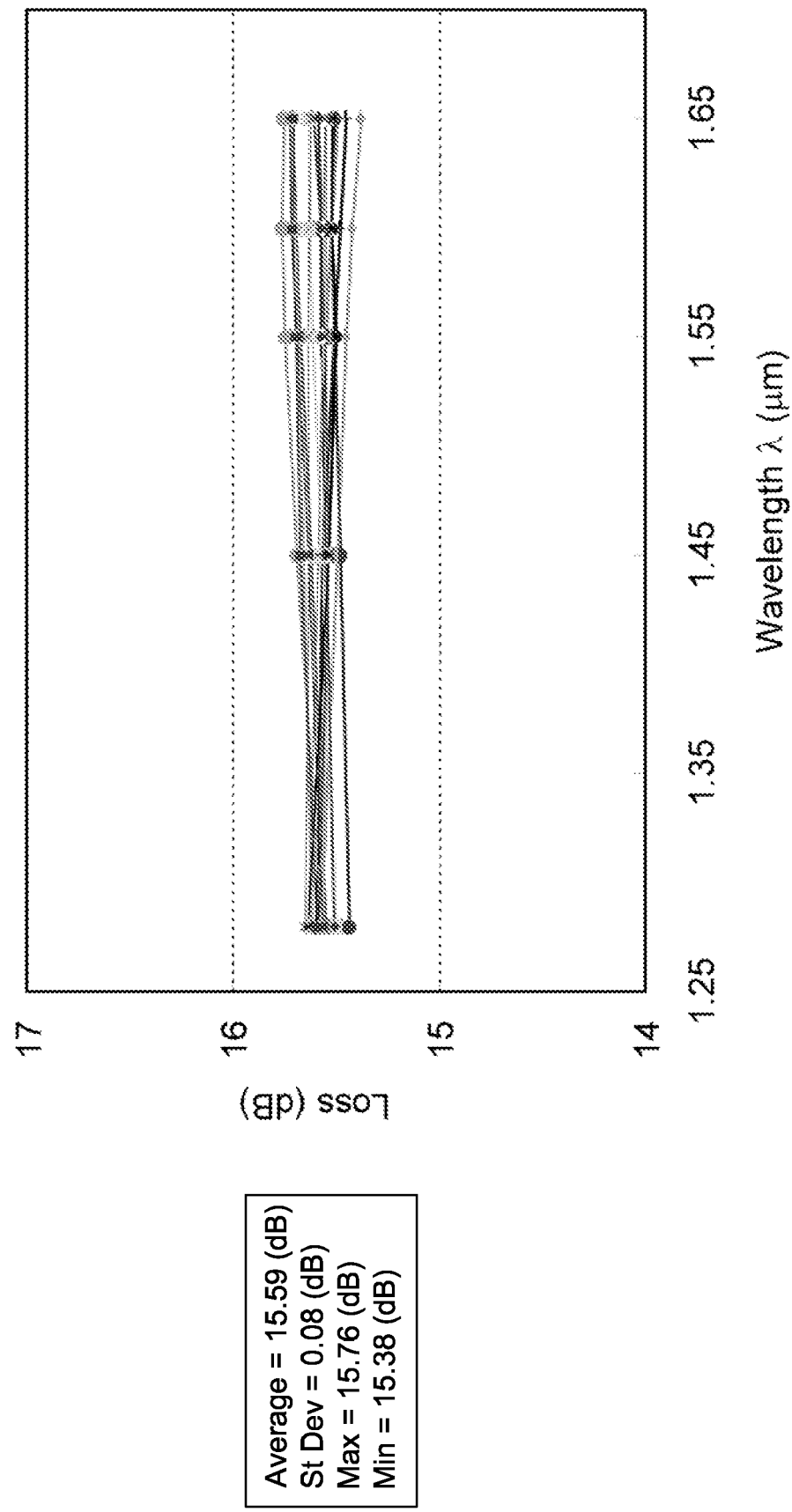
Figure 5B:
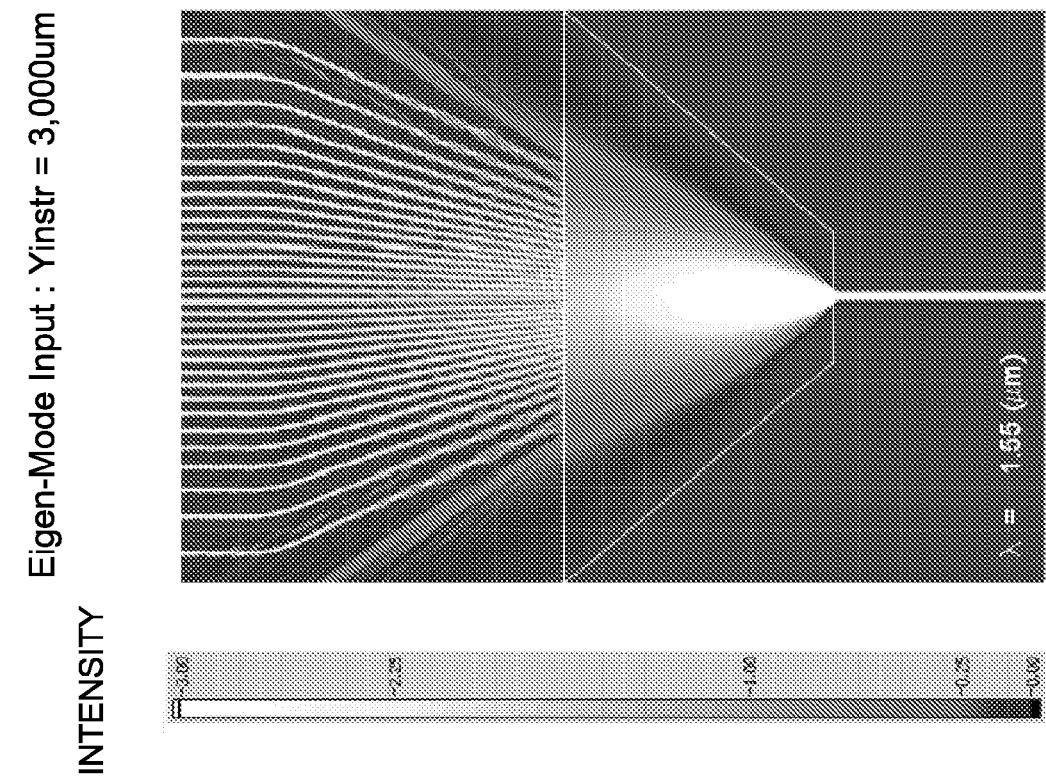
Figure 5A:
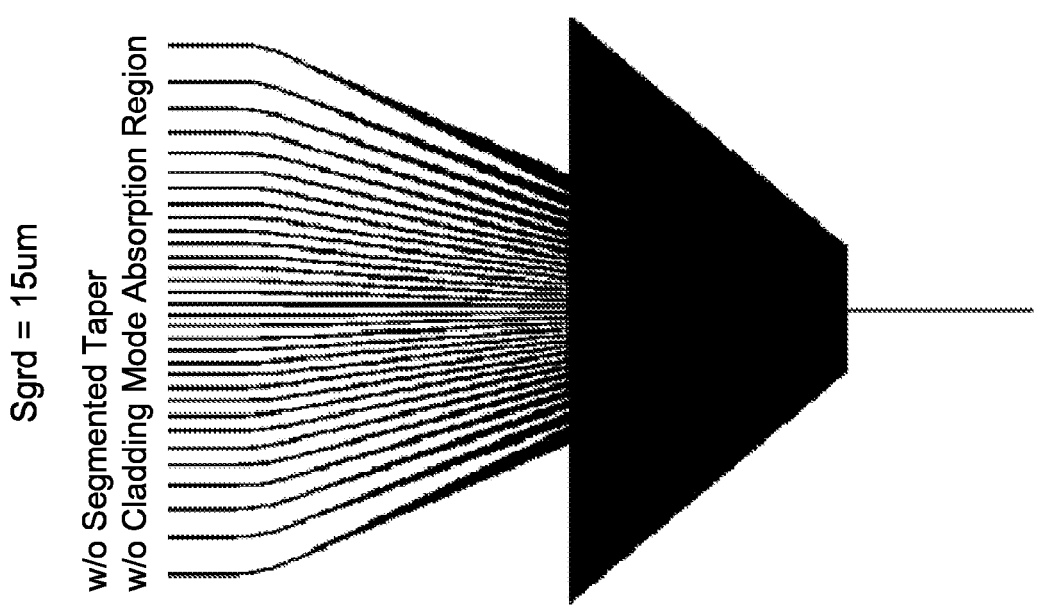
Figure 5C:
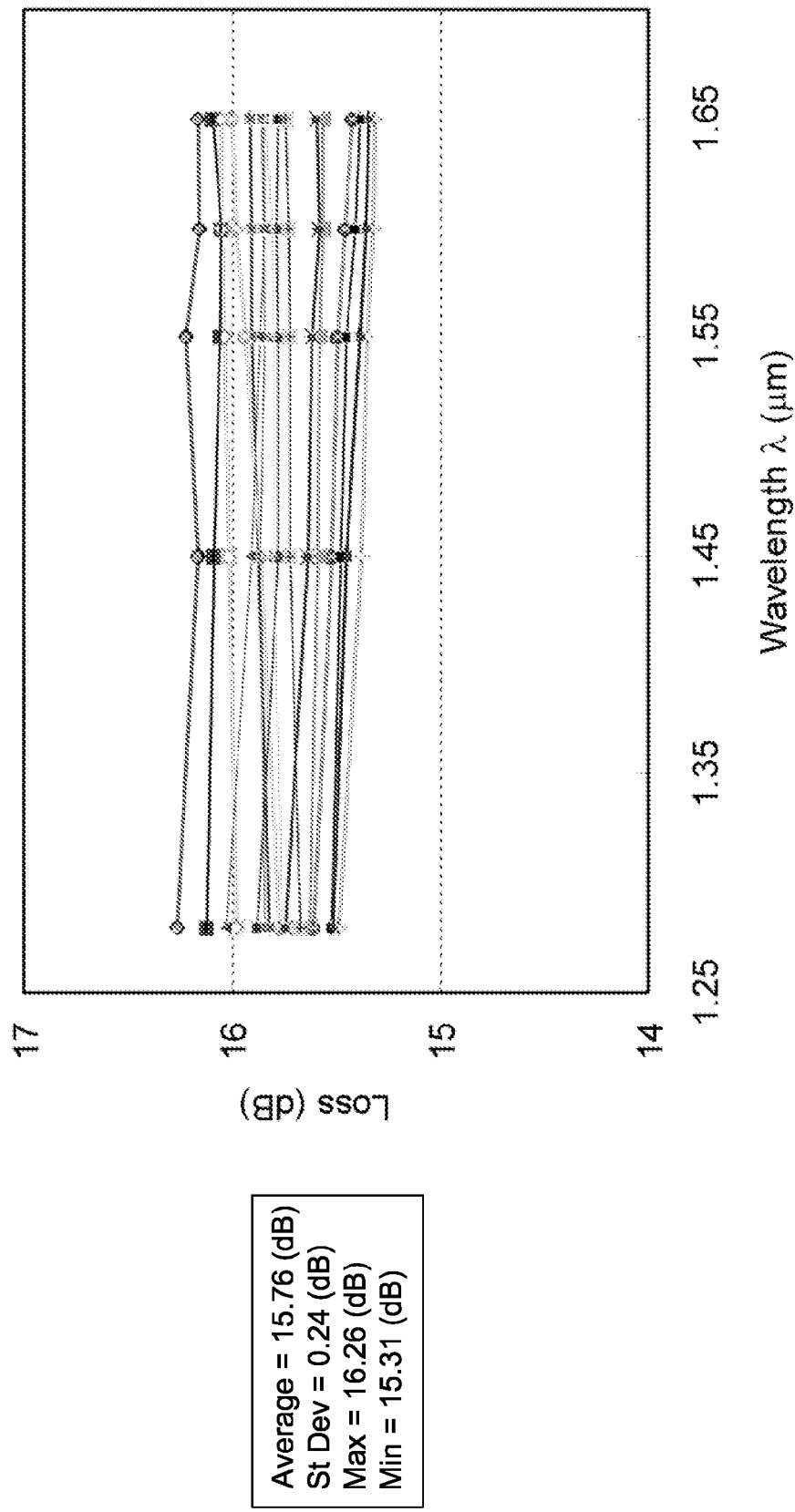
Figure 6B:
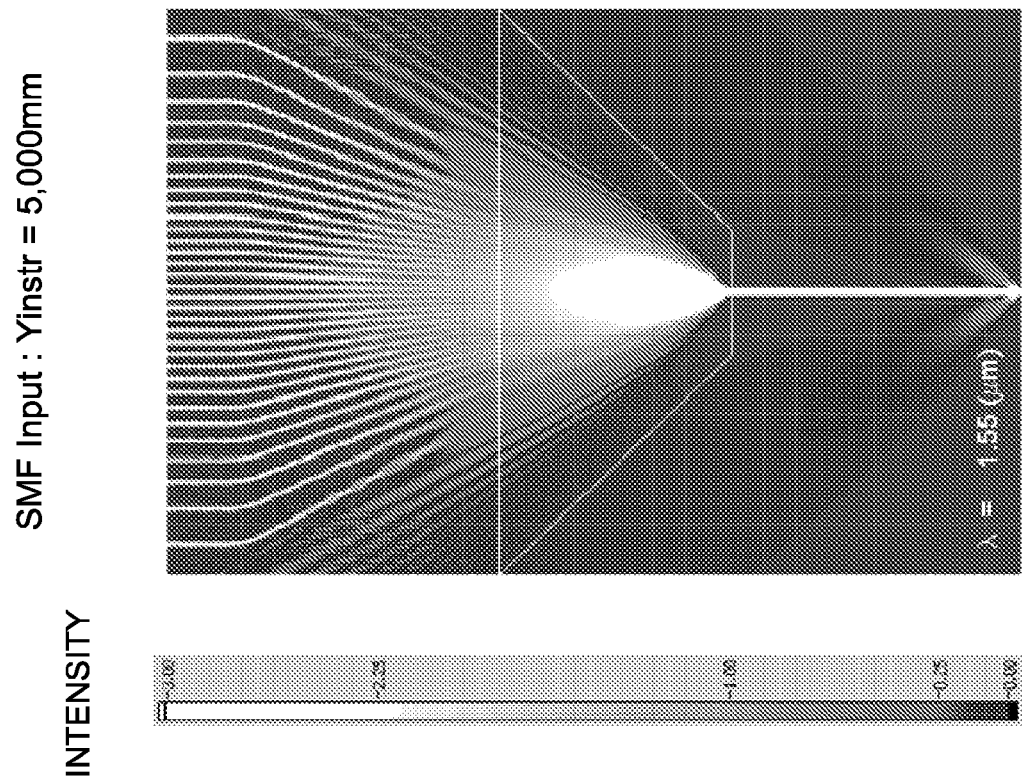
Figure 6A:
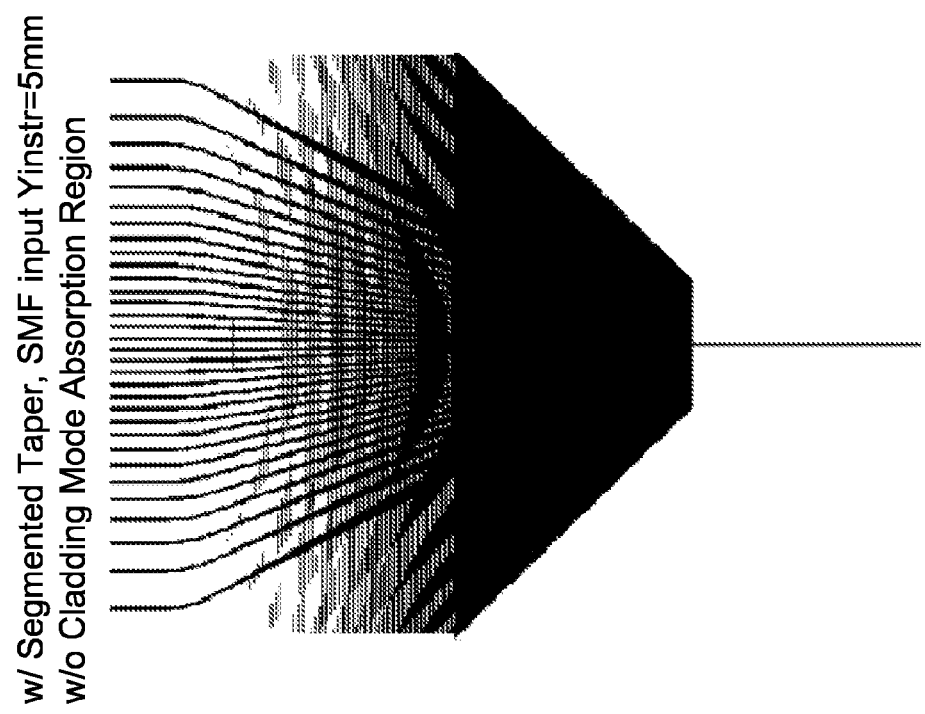
Figure 6C:
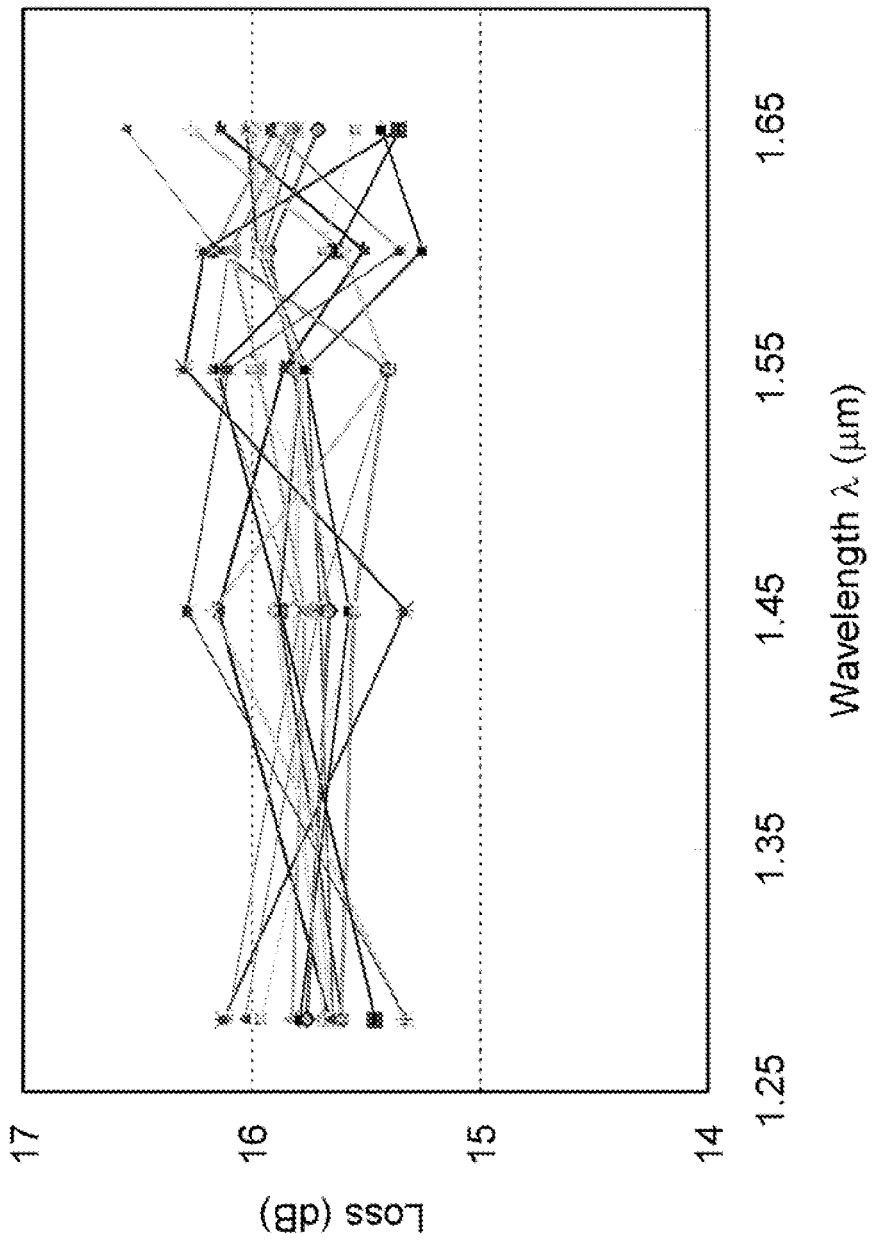
Figure 7B:
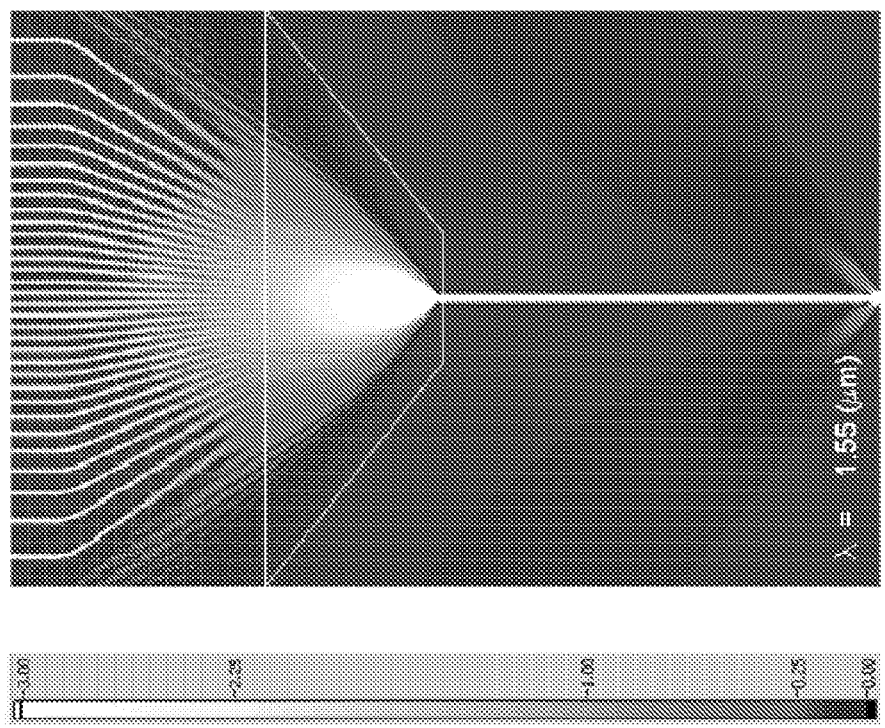
Figure 7A:
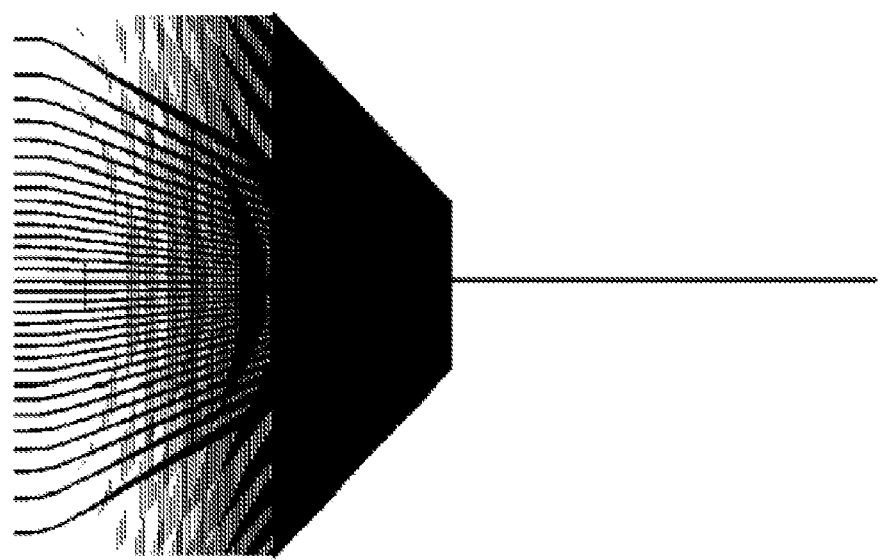
Figure 7C:
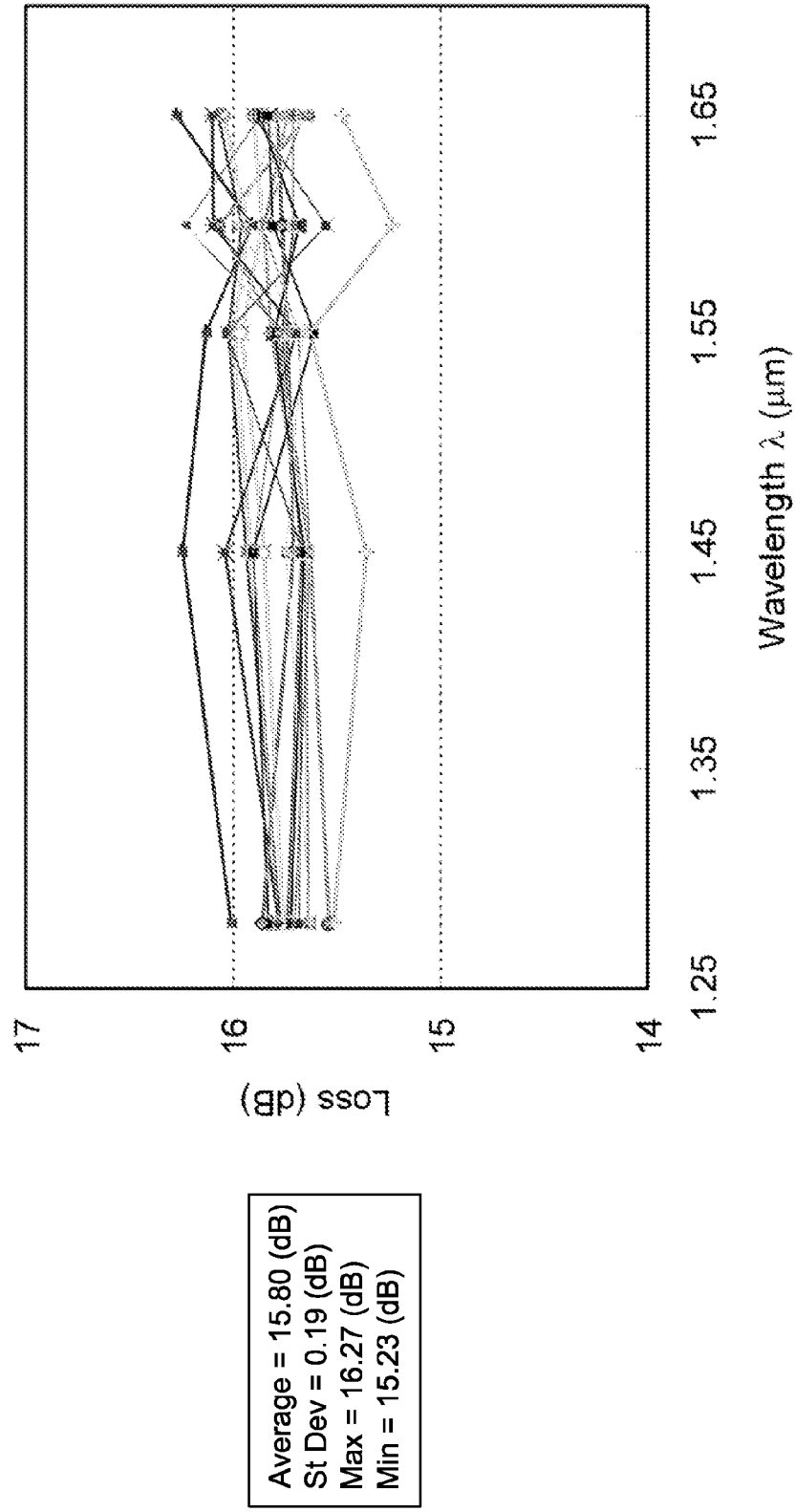
Figure 8B:
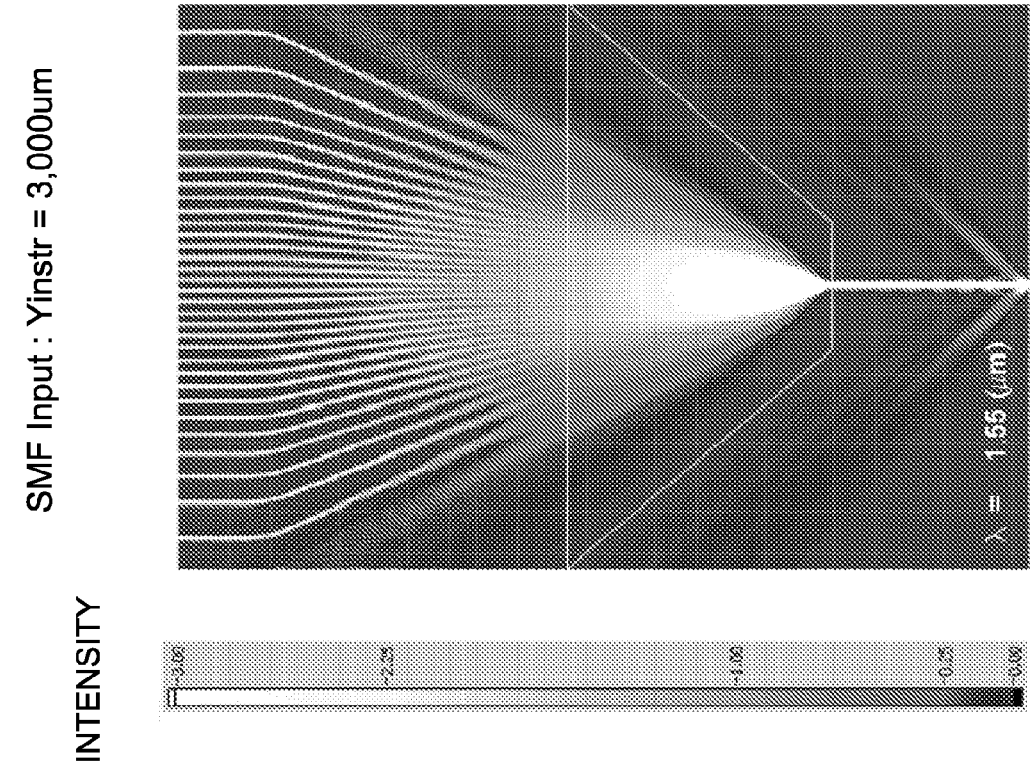
Figure 8A:
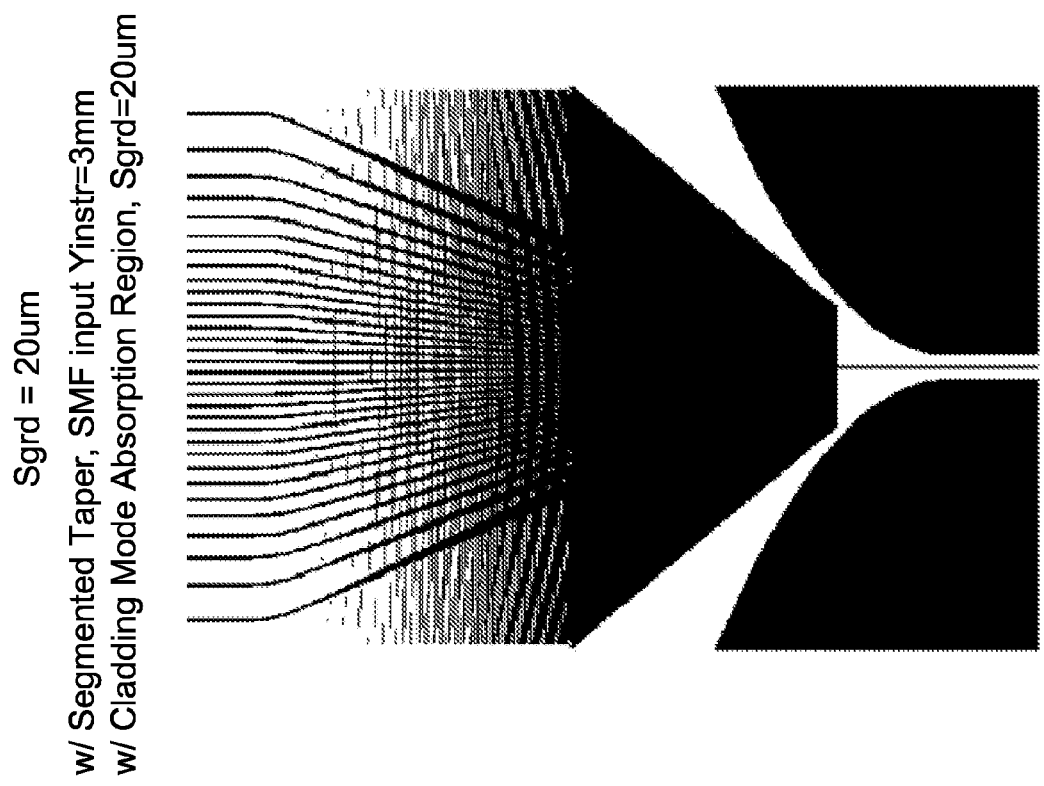
Figure 8C:
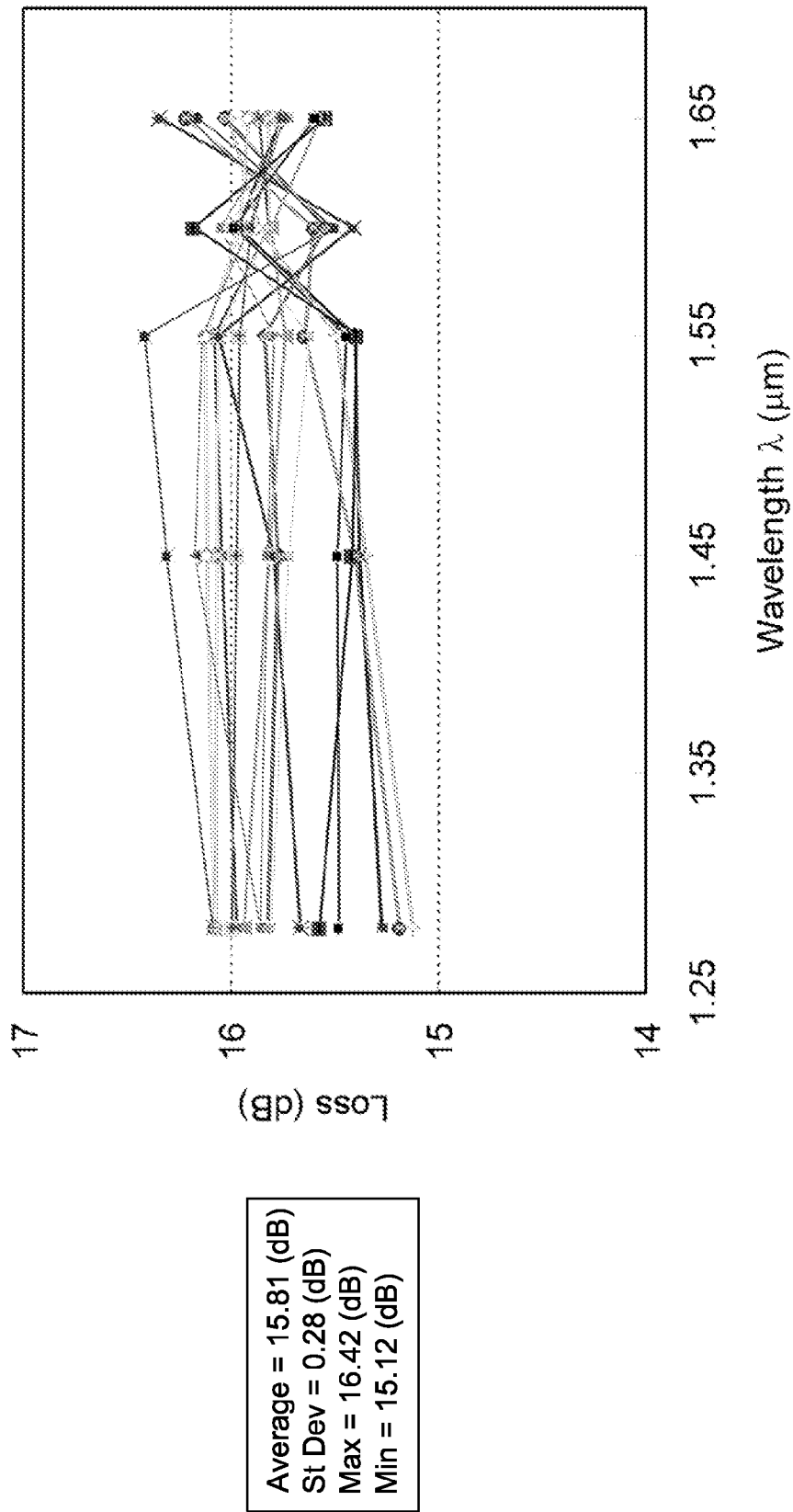
Figure 9C:
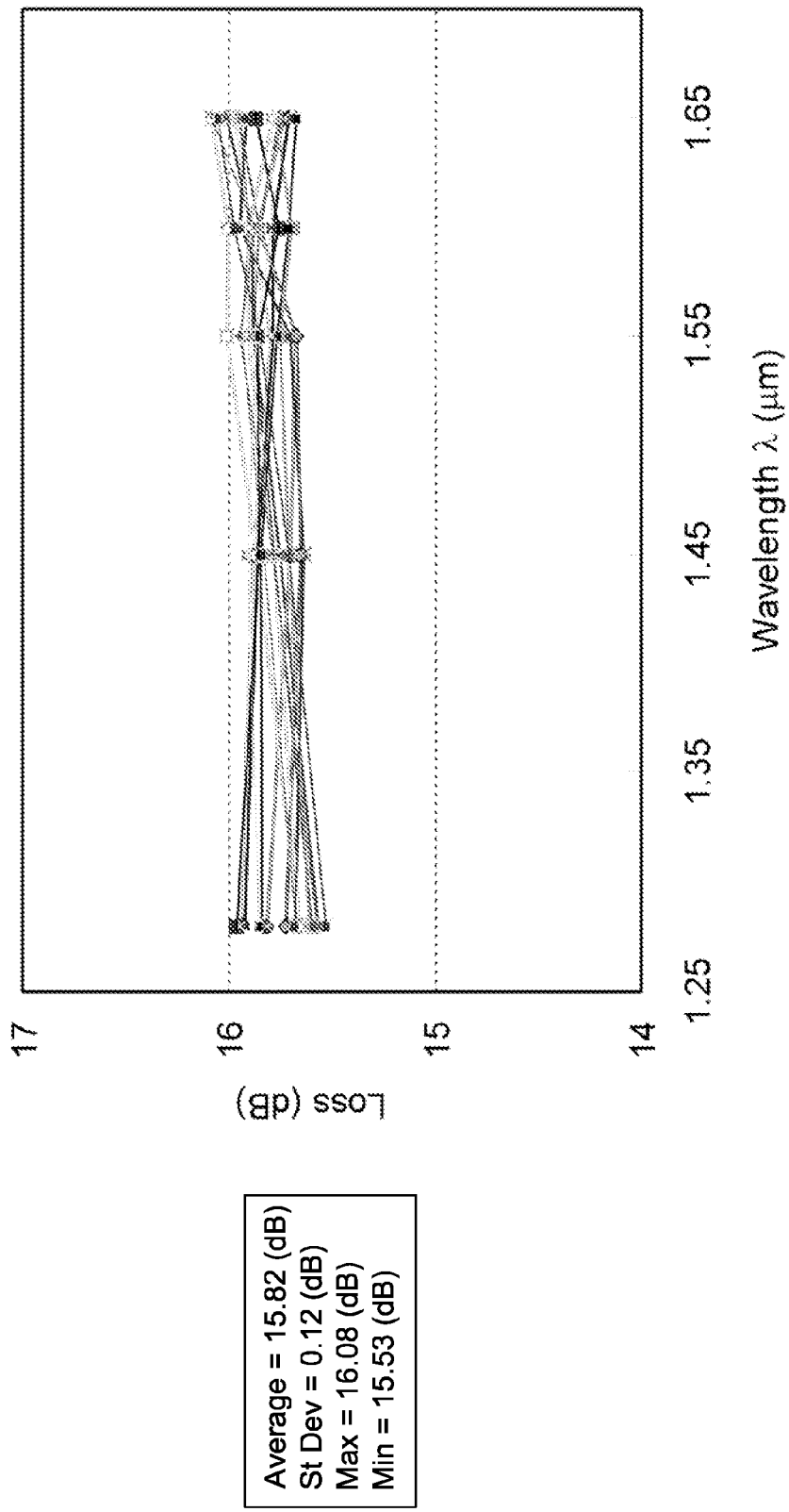
Figures 10A, 10B:
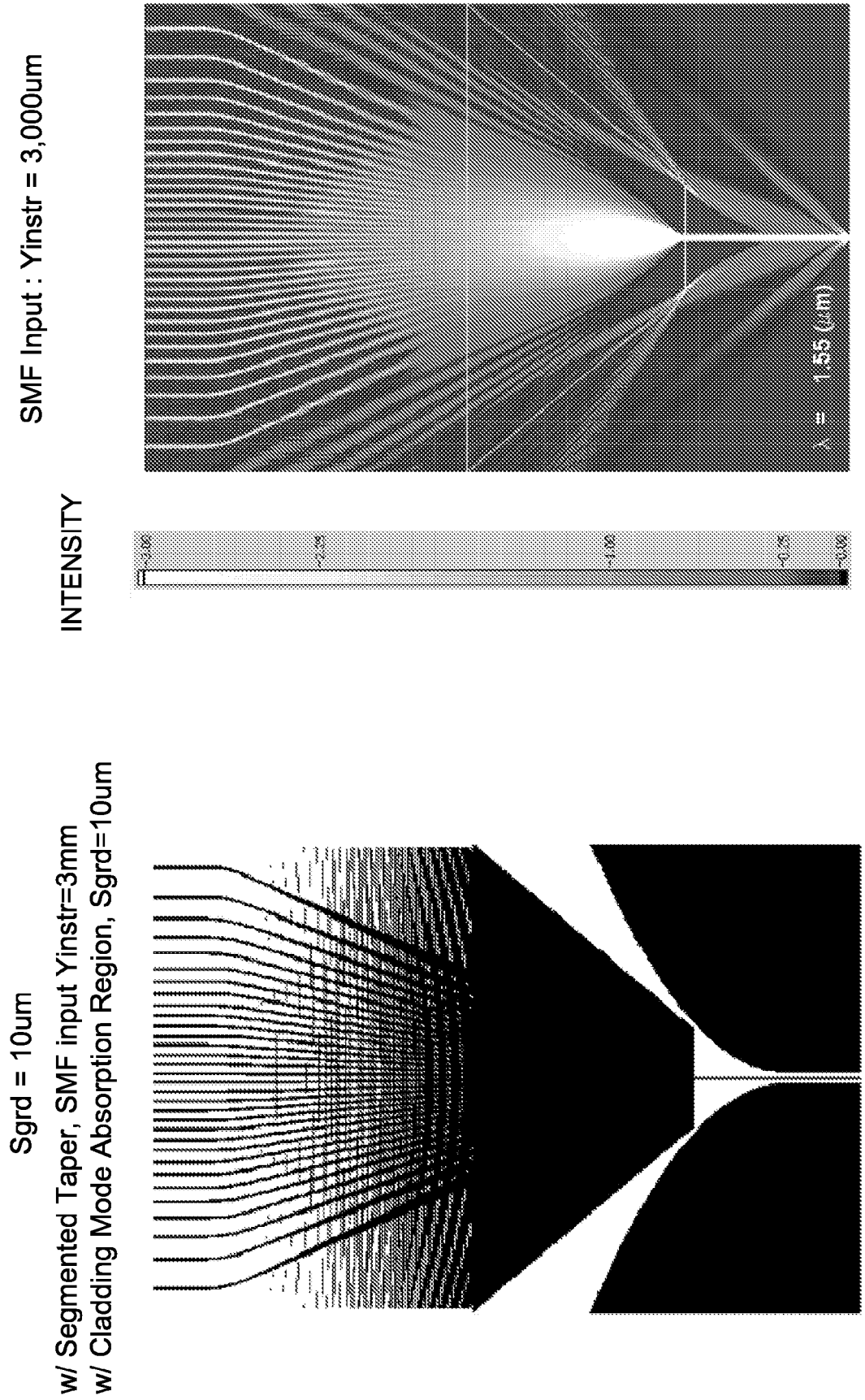
Figure 10C:
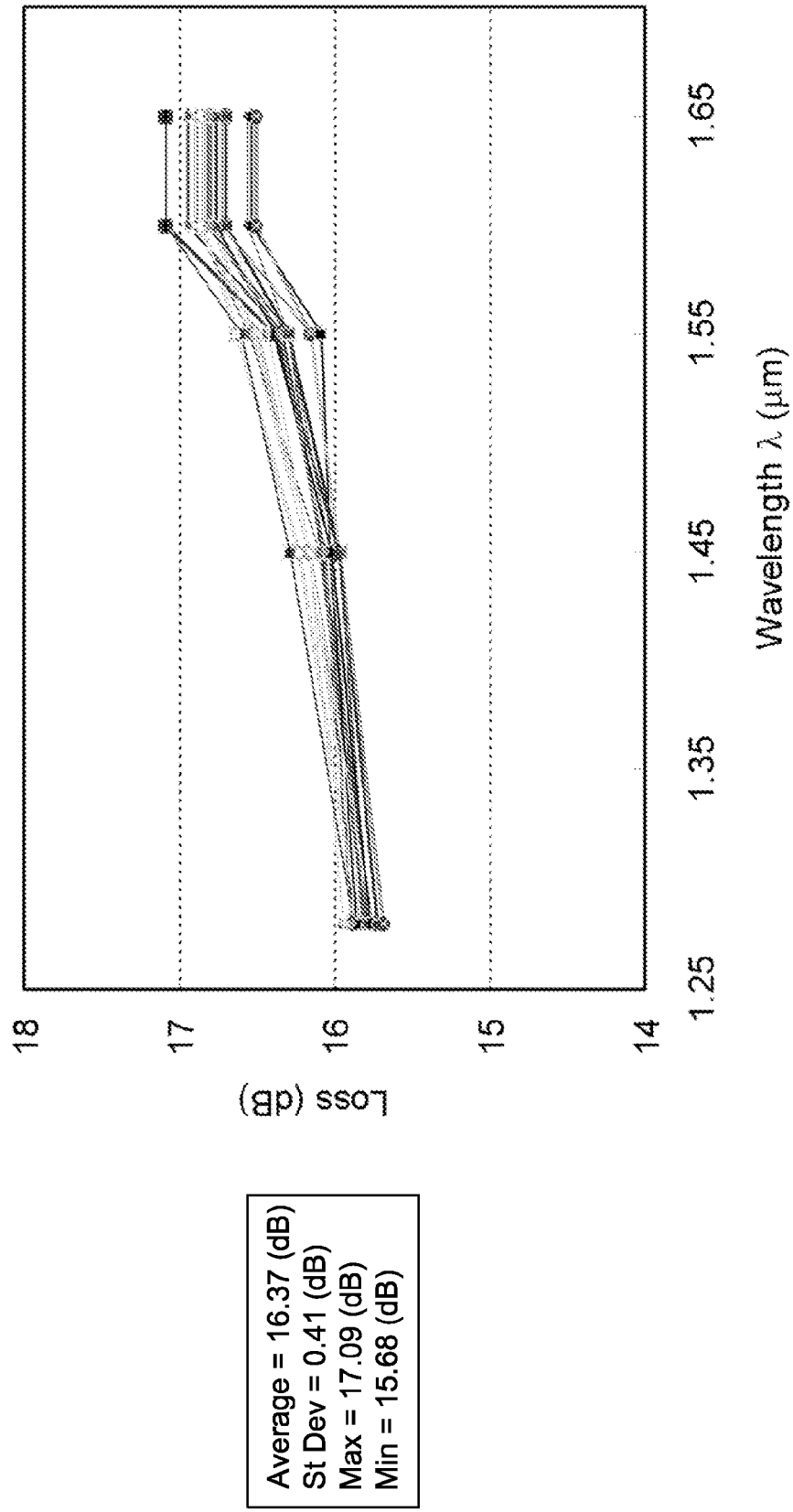

A funnel-type splitter with segmented taper structure 30 further reduces loss, using a plurality of waveguides 32 which cross the output waveguides 16 as shown in FIG. 3. If the crossing waveguides employ a taper structure (crossing waveguide width decreases toward output direction) the light coming into the gaps (space) will be returned to original core. This results in a lower loss structure.

Though these techniques can be used separately as contemplated by the present invention, a funnel-type splitter with both cladding mode absorption region 20 and segmented taper structure design 30 provides a "super" low loss splitter design, when considering both insertion loss and polarization dependent loss.

Figure 2A:
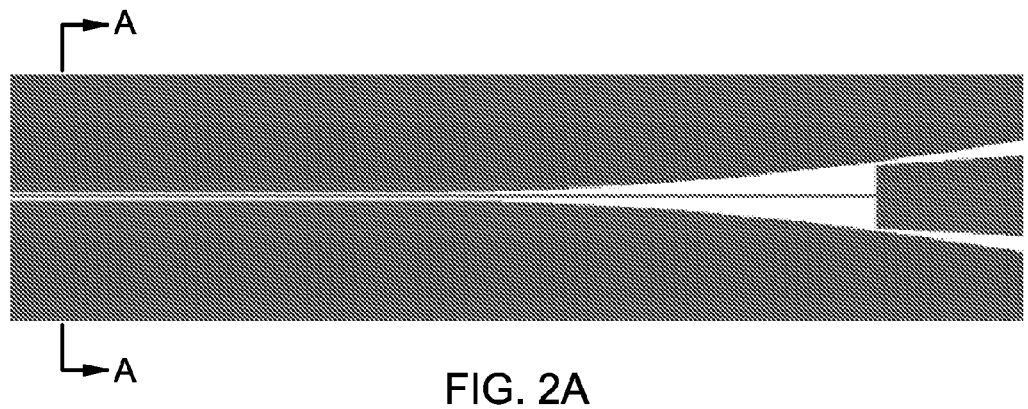
FIG. 2A shows the portion of the cladding mode absorption region of the present invention through which a sectional cut is noted.
Figure 2B:
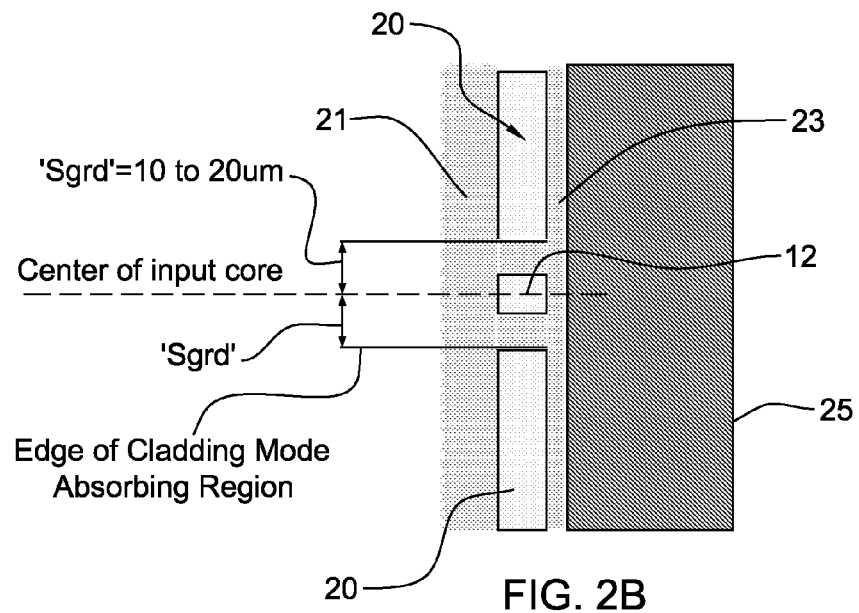
FIG. 2B is the sectional view of the section cut from FIG. 2A.

With reference to FIGS. 2A-B, one important design parameter is the distance from the center of input waveguide core to the cladding mode absorption region edge (designated Sgrd). As shown in this example, the absorption region runs parallel to the input waveguide, and then gradually runs away from this waveguide and around the slab. In the section shown, for M-delta (medium reflective index delta waveguide) Sgrd can be approximately 15 um. For L-delta Sgrd can be 15 to 16 um. For H-delta Sgrd can be 14 um. However, more generally this value can range from about 10 um through 20 um. FIG. 2B also shows additional detail of the waveguide structure over the substrate. In general, all waveguides, the cladding mode absorption region, and the segmented taper structure are formed on the same planar layer, and of the same material, in accordance with known PLC fabrication techniques.

FIGS. 4-10C show various test results for a 1×32 splitter with and without the improvements of the present invention, and varying Yinst and Sgrd parameters, across the typical fiber optic transmission wavelengths. (These test results and the notes thereon can be interpreted by one skilled in the art.) For example, FIG. 8C shows average of 15.8 dB loss, compared to a typical Y-branch splitter loss of 16.5 to 16.8 dB. If ideal input of light is used, the invention provides an improvement of at least 0.5 dB for funnel type splitter.

Figure 11B:
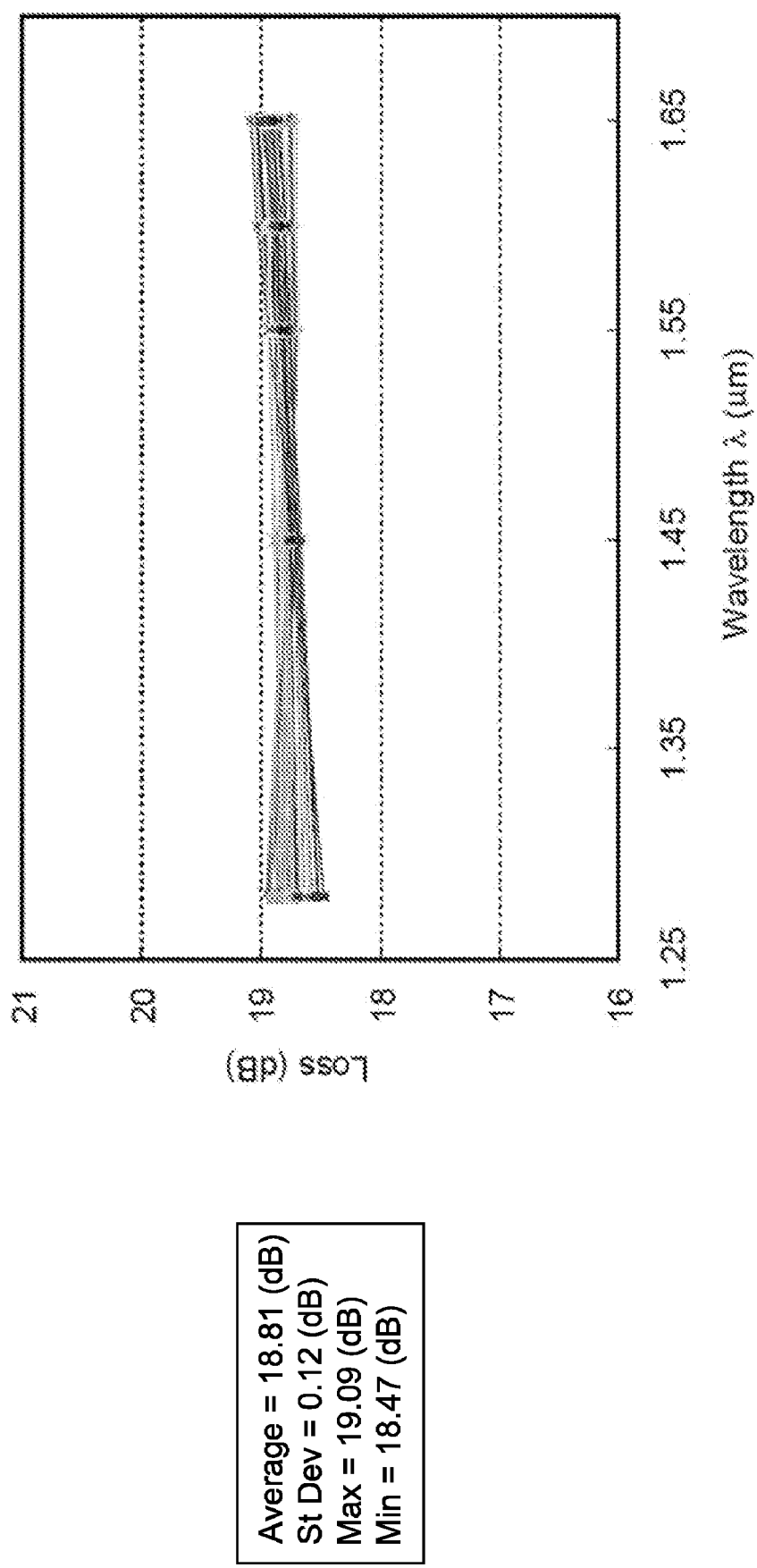

FIGS. 11A & 11B depict a 1×64 exemplary splitter, in accordance with an aspect of the present invention and performance data thereof, respectively.

Either quartz or polymer waveguide technologies can be employed for all waveguides and the cladding mode absorption region, over a silicon substrate, a glass-based substrate and or any other suitable substrate materials. However, advantageously, the funnel type PLC splitter does not require quartz substrate due to its very low PDL, and silicon can be used. Silicon wafers are known to be lower cost, with a higher resistance to fracture.

The principles of the present invention can also be applied to printed circuit board technologies (possibly over silicon, polymer or glass substrates); and metal substrates.

The disclosed cladding mode absorption region design is applicable not only to funnel type splitters, but also to Y-branch type splitters, PLC-VOAs, PLC-AWGs, and PLC-Switch devices.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A funnel-type planar lightwave circuit optical splitter, comprising:
   an input optical waveguide, comprising a core region and a cladding region, for carrying an input optical signal;
   a slab waveguide for receiving the input optical signal from the input optical waveguide;
   a plurality of output waveguides projecting from the slab waveguide into which the input optical signal is split; and
   a cladding mode absorption region running along either side, or both sides, of the input optical waveguide;
   wherein the cladding mode absorption region runs gradually away from the input waveguide as the input waveguide approaches the slab waveguide.

2. The splitter of claim 1, wherein the cladding mode absorption region continues to run along at least a portion of the slab waveguide.

3. The splitter of claim 1, wherein the input waveguide, slab waveguide, and output waveguides are formed from quartz or polymer.

4. The splitter of claim 1, wherein a substrate underlying the waveguides is formed from silicon or glass.

5. The splitter of claim 1, wherein the cladding mode absorption region is formed from quartz or polymer.

6. The splitter of claim 1, wherein the region connecting the slab waveguide to the plurality of output waveguides is characterized by a segmented taper structure.

* * * * *